United States Patent
Khan et al.

(10) Patent No.: US 10,088,701 B2
(45) Date of Patent: Oct. 2, 2018

(54) ELECTRONIC WRITING DEVICE WITH DOT PATTERN RECOGNITION SYSTEM

(71) Applicant: Kent Displays Incorporated, Kent, OH (US)

(72) Inventors: Asad Khan, Kent, OH (US); Mauricio Echeverri, Akron, OH (US); Erica Montbach, Kent, OH (US)

(73) Assignee: Kent Displays Inc., Kent, OH (US)

( * ) Notice: Subject to any disclaimer, the term of this patent is extended or adjusted under 35 U.S.C. 154(b) by 97 days.

(21) Appl. No.: 14/069,901

(22) Filed: Nov. 1, 2013

(65) Prior Publication Data
US 2015/0124178 A1 May 7, 2015

(51) Int. Cl.
*G02F 1/1333* (2006.01)
*G02F 1/137* (2006.01)
*G06F 1/16* (2006.01)
*G06F 3/0354* (2013.01)
*G06F 3/041* (2006.01)

(52) U.S. Cl.
CPC ...... *G02F 1/13338* (2013.01); *G02F 1/13718* (2013.01); *G06F 1/1652* (2013.01); *G06F 3/03545* (2013.01); *G06F 3/041* (2013.01)

(58) Field of Classification Search
CPC .............. G02F 1/13338; G06F 3/0412; G06F 3/03545; G06F 3/03542
See application file for complete search history.

(56) References Cited

U.S. PATENT DOCUMENTS

| 4,172,333 A | 10/1979 | Towsend |
| 4,525,032 A | 6/1985 | Hilsum |
| 4,688,900 A | 8/1987 | Doane et al. |
| 4,700,022 A | 10/1987 | Salvador et al. |
| 4,730,186 A | 3/1988 | Koga et al. |
| 4,786,765 A | 11/1988 | Yamanami et al. |

(Continued)

FOREIGN PATENT DOCUMENTS

| JP | 05053537 | 3/1993 |
| JP | 8035759 | 2/1996 |

(Continued)

OTHER PUBLICATIONS

Anoto. "Panasonic to Debut its New 4K Tablet Integrated with Anoto Digital Writing Technology at IFA Show in Berlin," PRN Newswire, Sep. 6, 2013.

(Continued)

*Primary Examiner* — Jessica M Merlin
(74) *Attorney, Agent, or Firm* — Abel Law Group, LLP

(57) ABSTRACT

A cholesteric liquid crystal (ChLC) electronic writing device incorporates a dot pattern recognition system. When writing pressure is applied to the writing device an image composed of writing or drawing is displayed by a pressure sensitive ChLC polymer dispersion stacked in a multilayer system of the device. A specialized stylus with sensor and associated electronics is used to form the image on the electronic writing device. The stylus produces electrical information indicating the path or trajectory of the writing that is displayed by the electronic writing device, which can be transferred via wireless signal to any other displaying device. This forms a replica image on the displaying device that is a replica of the image on the electronic writing device.

23 Claims, 8 Drawing Sheets

(56) References Cited

U.S. PATENT DOCUMENTS

| | | | |
|---|---|---|---|
| 5,031,119 A | 7/1991 | Dulaney et al. |
| 5,119,079 A | 6/1992 | Hube et al. |
| 5,135,125 A | 8/1992 | Andel et al. |
| 5,136,125 A | 8/1992 | Russell |
| 5,398,276 A | 3/1995 | Lemke et al. |
| 5,437,811 A | 8/1995 | Doane et al. |
| 5,453,863 A | 9/1995 | West et al. |
| 5,545,857 A | 8/1996 | Lee et al. |
| 5,579,487 A | 11/1996 | Meyerson et al. |
| 5,587,054 A | 12/1996 | Tyneski et al. |
| 5,596,350 A | 1/1997 | Capps et al. |
| 5,597,470 A | 1/1997 | Meyerson et al. |
| 5,597,562 A | 1/1997 | Sato et al. |
| 5,644,330 A | 7/1997 | Catchpole et al. |
| 5,691,795 A | 11/1997 | Doane et al. |
| 5,715,524 A | 2/1998 | Jambhekar et al. |
| 5,742,894 A | 4/1998 | Jambhekar et al. |
| 5,748,185 A | 5/1998 | Stephan et al. |
| 5,761,485 A | 6/1998 | Munyan |
| 5,768,492 A | 6/1998 | Schumer |
| 5,771,039 A * | 6/1998 | Ditzik ............... G02B 6/08 257/E27.111 |
| 5,778,404 A | 7/1998 | Capps et al. |
| 5,847,798 A | 12/1998 | Yang et al. |
| 5,867,688 A | 2/1999 | Simmon et al. |
| 5,889,566 A | 3/1999 | Wu et al. |
| 5,930,026 A | 7/1999 | Jacobson et al. |
| 5,949,501 A | 9/1999 | Izuno et al. |
| 6,100,877 A | 8/2000 | Chery et al. |
| 6,104,448 A * | 8/2000 | Doane ............... C09K 19/02 349/12 |
| 6,215,475 B1 | 4/2001 | Meyerson et al. |
| 6,266,045 B1 | 7/2001 | Meyerson et al. |
| 6,268,839 B1 | 7/2001 | Yang et al. |
| 6,353,433 B1 | 3/2002 | Schumer |
| 6,377,321 B1 | 4/2002 | Khan et al. |
| 6,473,072 B1 | 10/2002 | Comiskey et al. |
| 6,639,578 B1 | 10/2003 | Comiskey et al. |
| 6,654,080 B1 | 11/2003 | Khan et al. |
| 6,663,008 B1 * | 12/2003 | Pettersson ......... G06F 3/03545 235/494 |
| 6,697,039 B1 | 2/2004 | Yamakawa et al. |
| 6,730,862 B1 | 5/2004 | Gasparik |
| 6,753,933 B2 | 6/2004 | Cirkel et al. |
| 6,756,970 B2 | 6/2004 | Keely, Jr. et al. |
| 6,759,399 B1 | 7/2004 | Petit et al. |
| 6,811,815 B2 | 11/2004 | He et al. |
| 6,819,310 B2 | 11/2004 | Huang et al. |
| 6,825,829 B1 | 11/2004 | Albert et al. |
| 6,842,210 B2 | 1/2005 | Hashimoto et al. |
| 6,999,061 B2 | 2/2006 | Hara et al. |
| 7,061,559 B2 | 6/2006 | Khan et al. |
| 7,132,064 B2 | 11/2006 | Li et al. |
| 7,136,048 B2 | 11/2006 | Yrjanainen et al. |
| 7,170,481 B2 | 1/2007 | Doane et al. |
| 7,242,394 B2 | 7/2007 | Lahade et al. |
| 7,245,483 B2 | 7/2007 | Feague et al. |
| 7,351,506 B2 | 4/2008 | Schneider et al. |
| 7,385,656 B2 | 6/2008 | Nose et al. |
| 7,746,430 B2 | 6/2010 | Kurosaki et al. |
| 8,139,039 B2 | 3/2012 | Schneider et al. |
| 8,228,301 B2 | 7/2012 | Schneider |
| 8,310,630 B2 | 11/2012 | Marhefka et al. |
| 9,588,602 B2 | 3/2017 | Kwak |
| 2003/0058227 A1 | 3/2003 | Hara et al. |
| 2003/0071754 A1 | 4/2003 | McEwan |
| 2003/0137496 A1 | 7/2003 | Stevens et al. |
| 2003/0156099 A1 | 8/2003 | Yrjanainen et al. |
| 2003/0156243 A1 | 8/2003 | Yoshihara et al. |
| 2004/0140964 A1 | 7/2004 | Wang et al. |
| 2004/0145691 A1 | 7/2004 | Kubota et al. |
| 2004/0159702 A1 | 8/2004 | Rosenfeld |
| 2004/0207606 A1 | 10/2004 | Atwood et al. |
| 2004/0263486 A1 | 12/2004 | Seni |
| 2005/0079386 A1 | 4/2005 | Brown et al. |
| 2005/0104806 A1 | 5/2005 | Stephenson |
| 2005/0162400 A1 * | 7/2005 | Tseng ............... G02F 1/13338 345/173 |
| 2006/0151601 A1 | 7/2006 | Rosenfeld |
| 2006/0204675 A1 | 9/2006 | Gao et al. |
| 2006/0262235 A1 | 11/2006 | Vogels et al. |
| 2006/0267955 A1 | 11/2006 | Hino |
| 2007/0026163 A1 | 2/2007 | Schneider et al. |
| 2007/0059901 A1 | 3/2007 | Majumdar et al. |
| 2007/0063939 A1 | 3/2007 | Bellamy |
| 2007/0237906 A1 | 10/2007 | Li et al. |
| 2007/0238080 A1 | 10/2007 | Lynch |
| 2007/0277659 A1 | 12/2007 | Schneider et al. |
| 2007/0285385 A1 | 12/2007 | Albert et al. |
| 2008/0019616 A1 * | 1/2008 | Hotta ............... G06F 3/0421 382/313 |
| 2008/0309598 A1 | 12/2008 | Doane et al. |
| 2009/0033811 A1 * | 2/2009 | Schneider ......... G06F 3/0412 349/12 |
| 2009/0096942 A1 | 4/2009 | Schneider et al. |
| 2010/0265214 A1 | 10/2010 | Green et al. |
| 2012/0268420 A1 | 10/2012 | Marhefka et al. |
| 2013/0082949 A1 | 4/2013 | Kwak et al. |
| 2013/0107144 A1 | 5/2013 | Marhefka et al. |
| 2013/0321357 A1 | 12/2013 | Yamada et al. |
| 2014/0093708 A1 * | 4/2014 | Yamada ............... G06F 3/041 428/203 |

FOREIGN PATENT DOCUMENTS

| | | | |
|---|---|---|---|
| JP | 2001125108 | | 5/2001 |
| JP | 2001334693 | | 12/2001 |
| JP | 2002163070 | | 6/2002 |
| JP | 2004331697 | | 11/2004 |
| WO | 2010138568 | | 2/2010 |
| WO | 2013161236 A1 | | 10/2013 |
| WO | WO 2013161236 A1 * | 10/2013 | ............... G06F 3/041 |

OTHER PUBLICATIONS

International Search Report and Written Opinion dated Nov. 18, 2014 for PCT/US2014/049345.
U.S. Appl. No. 13/666,583, filed Nov. 1, 2012.
U.S. Appl. No. 61/554,189, filed Nov. 1, 2011.
U.S. Appl. No. 13/458,223, filed Apr. 27, 2013.
U.S. Appl. No. 13/477,638, filed May 22, 2012.
U.S. Appl. No. 13/897,004, filed May 17, 2013.
C. Braganza, et al., Durability and Reliability of eWriters, SID International Symposium Digest of Technical Papers 44 (2013) pp. 1254-1256.
U.S. Appl. No. 13/754,481, filed Jan. 30, 2013.
"Cholesteric Liquid Crystals for Flexible Displays" by Ed. G. Crawford.
Dry Erase Presentation Boards; http://speakeasydryerase.com/files/specifications/SelfAdhesiveSpec.pdf.
Etch a Sketch Animator 2000; http://en.wikipedia.org/wiki/Etch_A_Sketch.
U.S. Appl. No. 14/057,261, filed Oct. 18, 2013.
International Search Report for Appl. No. PCT/US2010/036175.
How Magna Doodle Works; http://entertainment.howstuffworks.com/magna-doodle.htm.
Interactive Whiteboard; http://www.alibaba.com/product-gs/212710367/Interactive_Whiteboard.html.
InkChat Project, ORCCA Lab, Department of Computer Science, The University of Western Ontario, http://www.csd.uwo_ca/~rhu8/Research/Projects/InkChat/inkChat.html, Jul. 9, 2013.
J.William Doane and Asad Khan, Flexible Flat Panel Displays, Editor Gregory P. Crawford, Chapter 17: Cholesteric Liquid Crystals for Flexible Displays, 2005 John Wiley & Sons, pp. 331-354.
N. Brenner and S. Sullivan, "4-Wire and 8-Wire Resistive Touch-Screen Controller Using the MSP430-Application Report SLAA384", Feb. 2008, pp. 1-10, Texas Instruments, Dallas, TX.
Notice of Allowance dated Feb. 16, 2012 from U.S. Appl. No. 12/217,158, filed Jul. 1, 2008.

(56) References Cited

OTHER PUBLICATIONS

Office Action dated Jun. 24, 2011 from U.S. Appl. No. 11/762,174, filed Jun. 13, 2007.
Final Office Action dated Jan. 19, 2012 from U.S. Appl. No. 11/762,174, filed Jun. 13, 2007.
Smartboard Polycom IVC; http://dl.austincc.edu/ivc/equipment/smartboardh323.htm.
Ink Markup Language, W3C Recommendation Sep. 20, 2011, http://www.w3.org/TR/2011/REC-InkML-20110920/.
U.S. Appl. No. 61/181,716, filed May 28, 2009.
ADP-601 electronic pen; black paper sheet with infrared dot array and PenHub Software all from Pengenerations, Jun. 23, 2013, http://pengenerations.com/.

* cited by examiner

ELECTRONIC WRITING DEVICE WITH DOT PATTERN RECOGNITION SYSTEM

JOINT RESEARCH AGREEMENT

The claims of this disclosure were made as a result of activities undertaken within the scope of a joint research agreement. The parties to the joint research agreement were PEN Generations Inc. and Kent Displays, Inc., the Applicant of the above-identified patent application.

TECHNICAL FIELD

This disclosure pertains to electronic writing devices or tablets including a device for capturing an image drawn or written on the device.

TECHNICAL BACKGROUND

Recently, the pressure sensitive cholesteric liquid crystal (ChLC) writing tablet, Improv Electronics® Boogie Board® LCD eWriter, has appeared on the market in which a pointed stylus or the finger can be used to write or trace an image on the surface of the tablet as described in U.S. Pat. No. 6,104,448, which is incorporated herein by reference in its entirety. (Improv Electronics® is a unit of Kent Displays, Inc.) Such a stylus does not transfer any ink or other material to any surface. This tablet offers a considerable improvement over previous tablet technologies in that the image can be simply and instantly erased with the push of a button that applies a voltage pulse to electrodes in the tablet. In a ChLC tablet, the liquid crystal is commonly dispersed in a polymer network and sandwiched between two substrates that are spaced to a particular gap. The upper substrate is flexible and the bottom substrate is painted with a light absorbing (black or colored) background. The cell gap is usually set by plastic or glass spacers that are either cylindrical or spherical in shape. When one presses on the top substrate with a pointed stylus, fingernail or other object, the liquid crystal is locally displaced. Flow induced in the liquid crystal changes its optical texture from a substantially transparent to a brilliant reflective color at the location of the pressure. The reflective lighter color contrasts well to the dark background of the lower substrate. An image traced by the stylus or finger will remain on the tablet indefinitely until erased, typically consuming no power. Erasure is accomplished by applying a voltage pulse to substantially transparent conducting electrodes on the inner surface of the substrates that drive the ChLC from its color reflective state back to its substantially transparent state.

The above referenced technology and its applications are disclosed in more detail in U.S. Pat. No. 6,104,448, filed on Dec. 15, 1999, which is incorporated herein by reference in its entirety. Polymer dispersions of the cholesteric liquid crystal can be used to control the pressure sensitivity as described in U.S. Pat. No. 8,228,301, filed on May 16, 2008, and incorporated herein by reference in its entirety. Other modes of operation, including multiple color images, negative images and select erase, are described in the patent given immediately above as well as U.S. Pat. No. 8,139,039 filed on Jul. 29, 2008, and incorporated herein by reference in its entirety.

In order to provide image digitization, a touchscreen was incorporated in the back of the device as disclosed in published U.S. Patent Application Pub. No. 20120268420 A1, filed on Apr. 27, 2012 and incorporated herein by reference in its entirety. The touchscreen is locally activated when a specialized stylus applies pressure on the device surface. The pressure applied on the top substrate induces local shear driving the cholesteric liquid crystal from a dark state to a bright configuration in the stressed region. The drawing is simultaneously registered in the back touchscreen which digitizes the signal to a storage device. Therefore, an image is simultaneously observed in the writing display and captured as a digital image in a storage unit to be later recalled in a computer or mobile device screen. Different types of touchscreens can be used under this concept: resistive, capacitive, inductive and so forth.

A disadvantage of these types of digitizers is that most of them are rigid and in many cases fragile. In addition, the fabrication of each component is hard to incorporate into a continuous roll to roll manufacturing process. This disclosure explores other alternatives that will overcome these shortcomings.

TECHNICAL SUMMARY

Provided are a plurality of embodiments where a dot pattern recognition system is incorporated into a cholesteric liquid crystal (ChLC) writing device in various forms. This device and its modifications can display real time or near real time writing and drawing by means of a pressure sensitive ChLC dispersion stacked in a multilayer system. The dot pattern, such as incorporated into a dot pattern layer, indicates the movement of the stylus (e.g., its written trajectory) when the specialized stylus with optical sensor is used. Then, the information can be transferred from the stylus via wireless signal to any other displaying device. One unique feature is that the dot pattern layer can be used as structural component of the devices disclosed here. It does not only provide writing recognition functionality but is also an operational element of the stacked structure of the eWriter.

Provided is a device that uses a flexible layer of dot pattern that provides a localization code that can be read by a specialized digital pen. In a preferred embodiment, the patterned layer is placed under the ChLC eWriter flexible display by coupling with a pressure sensitive adhesive. When a user writes on the eWriter with a specialized stylus capable of optically detecting the dot pattern in the back with the optical sensor and electronics of the stylus, the electrical information or signal can be transmitted to an external processing device and later displayed and stored as an image format in a computer screen or mobile device. Examples of external processing devices include laptops, personal computers, cellular telephones, tablets and the like. These external processing devices include a processor and will typically include a display. Therefore, an image is simultaneously being constructed by the reading of the stylus on the dot pattern layer and visualized on the front display screen of the eWriter. When the drawing or writing is done, the image can be saved wirelessly and the eWriter display can be refreshed or erased by applying a small pulse erasing the image making it ready to be reused. Dot pattern technology is currently used in regular note taking paper products by writing with ink pens on each page. This disclosure provides a unique solution that avoids the constant replacing of paper-based note books by using only a reusable ChLC eWriter display. Other technologies have been applied in the past in order to digitize the writing (also referred to synonymously as drawing or as writing traces) on the eWriter. However, most of these technologies included a rigid digitizer in the back of the eWriter display. Using the dot patterning system, the eWriter multilayer stack preserves its flexibility and can be potentially produced in a continuous roll to roll manufacturing process. The same feature can be applied to a variety of eWriter devices based on the ChLC technology.

Also provided is an additional embodiment where the dot pattern layer is allocated in the front plastic substrate using an optically clear pressure sensitive adhesive. The dot array is created with a special infrared ink only detectable by the modified stylus with an infrared camera that can detect the movement (also referred to synonymously as path or trajectory) of the stylus when writing on the surface.

Further provided is a writing tablet where the dot array is printed in the back or front transparent plastic substrates using infrared ink that preserve the optical clarity of the system allowing writing on the pressure sensitive display and digital tracking trajectory of the drawing when the stylus infrared camera detects the dot array so as to display in real time or near real time a digital image on the display of the external processing device relative to the time of formation of the image by the liquid crystal layer.

Also provided is an application of the dot pattern recognition layer to a large format tiling seamless eWriter known as eBoard consisting of a plurality of smaller manufacturable eWriter displays tiled seamlessly (see U.S. patent application Ser. No. 13/897,004) to create a larger pressure sensitive panel that can be covered (e.g., as a front or back surface) by a substantially transparent film with a dot pattern printed with infrared ink. This device can be used as a replacement of blackboards or whiteboards. The writing on an eBoard is performed with a specialized stylus attached to an infrared camera with a processing system capable of transmitting the drawing trajectory of the stylus to another external processing device. A white board concept can also be applied to a glass based polymer dispersed liquid crystal (PDLC) privacy window in which the dot pattern is laminated on one side of the window to be used as a smart board. Such a device would have switchable capabilities in which that it could be used a transparent window such as in an office environment that could be switched to a white translucent state for use as a white board. It would be written on with a regular dry-erase marker having an optic attachment capable to detect the position of the dry-erase marker, transmitting the electronic information to be saved in any other external processing device.

Further disclosed is a unique eWriter device with an external dot pattern accessory that can be attached to an eWriter with a special casing designed for this purpose. The external accessory includes a flexible transparent film that contains an invisible dot pattern printed with infrared ink. This film is sustained by a rigid plastic frame that fits in the eWriter and keeps the dot pattern layer flat and in adequate contact with the eWriter surface. In addition, by also using dot array code, the frame can contain specific commands that can be detected by the specialized stylus. In an alternative embodiment, the replaceable unit can be introduced in the Boogie Board® writing tablet as an insert in the back of the multilayer device as shown in U.S. patent application Ser. No. 13/477,638 (incorporated herein by reference in its entirety) that describes a Boogie Board® writing device using a semitransparent ink color filter as a background. The semitransparency of the liquid crystal display of the writing device enables the use of templates or patterns to be placed behind the display.

We also disclose an application where the dot pattern layer is attached to an eWriter with erasing capability. An eWriter where the user can erase a portion of the drawing is described in U.S. Pat. No. 8,139,039, which is incorporated herein by reference in its entirety. A layer with a dot pattern recognition array can be attached to the multilayer structure of the display providing recognition capability when an electronic stylus is used to write on the pressure sensitive surface. The stylus is designed such that its optical sensor or detector is able to recognize, decode and transmit the trajectory of writing through the identification of the dot array followed during writing. The special stylus can be used to erase a portion of the display while the digital stylus is instructed to overwrite the known position of the current figure with the background color of the image file.

It should be apparent to one skilled in the art that terms such as front, back, top and bottom are relative and should not be used to limit the disclosed embodiments. Moreover, it should also be appreciated, that the following terms used in this disclosure are synonymous and interchangeable as defined herein: semitransparent, substantially transparent, see-though and optically clear (e.g., a substantially transparent substrate, a see-through substrate, substantially transparent liquid crystal layer, substantially transparent electrically conductive layer and transparent pressure sensitive adhesive). The term transparent used in connection with an article should not be interpreted to require a specific degree of optical clarity of the article. Moreover, the terms "drawing" and "writing" are used as synonyms throughout this disclosure.

A first embodiment of the disclosure features an electronic writing device including the following features. A liquid crystal layer includes bistable cholesteric liquid crystal material dispersed in polymer. Electrically conductive layers are disposed on either side of the liquid crystal layer. A substantially transparent outer polymer layer is disposed adjacent one of the electrically conductive layers. A dot pattern is optically detectable on or through the outer polymer layer. A state of the liquid crystal is changed so as to form an image when writing pressure is applied to the outer polymer layer. A stylus applies the writing pressure. The stylus includes a sensor and electronic circuitry that reads the dot pattern so as to provide electrical information indicating movement of the stylus over the outer polymer layer.

Referring now to specific features of the first embodiment, the dot pattern can be disposed in or on a polymeric or paper material layer so as to form a dot pattern layer. The dot pattern layer can be located more distal from the outer polymer layer than the liquid crystal layer is disposed from the outer polymer layer. The electrically conductive layers, the outer polymer layer and the dot pattern layer can be flexible. In another feature a light absorbing layer absorbs light passing through the liquid crystal layer; the light absorbing layer being opaque or semitransparent; the light absorbing layer being disposed more distal from the liquid crystal layer than the dot pattern layer is disposed from the liquid crystal layer. In another feature the dot pattern layer can function as a light absorbing layer that absorbs light passing through the liquid crystal layer. In another feature dots of the dot pattern can be imprinted in or on the polymer of the dot pattern layer; moreover, a transparent pressure sensitive adhesive can be disposed between the dot pattern layer and an adjacent electrically conductive layer. A location of individual dots of the dot pattern layer (and position of the stylus relative to this location) can be discerned based on a position of the individual dots in the dot pattern. In another feature, the liquid crystal layer, the electrically conductive layers, the outer polymer layer and the dot pattern layer can be integral parts of the writing device. Another feature comprises a transparent pressure sensitive adhesive layer disposed between the outer polymer layer and the dot pattern layer, the dot pattern layer forming a writing surface on which the writing pressure is applied.

In another feature of the electronic writing device including the dot pattern layer, a plurality of the electronic writing devices are tiled together so as to be electrically interconnected with each other; wherein the dot pattern layer extends continuously across the plurality of writing devices.

Regarding further features, the dot pattern can be disposed in or on the outer polymer layer. The dot pattern layer can be transparent to visible light; moreover, dots of the dot pattern layer can be formed by ink that is viewable in infrared light but not in visible light. Another feature includes a rigid housing for at least the liquid crystal layer; wherein the housing includes a frame forming a slot that receives the dot pattern layer. Yet another feature comprises drive (e.g., erase) electronics that apply a voltage to the electrically conductive layers that places the liquid crystal material in a light reflective state or in a substantially transparent state (e.g., thereby erasing the image). In another feature the electrically conductive layers can be unpatterned and substantially continuous across the liquid crystal layer.

Yet another feature is that the sensor of the stylus includes an optical sensor. The stylus can be designed so as to leave no matter on a writing surface of the electronic writing device where the writing pressure is applied.

Another feature comprises an external processing device including a display; wherein the electrical information indicating movement of the stylus over the outer polymer layer produces on the display of the external processing device a replica image that is a replica of the image on the electronic writing device. In another feature the stylus and the external processing device include interfaces enabling the stylus to wirelessly transmit the electrical information to the external processing device which receives the electrical information and displays the replica image on the display of the external processing device. In another feature a command in a form of the dot pattern is disposed on the electronic writing device which when read by the sensor and the electronic circuitry of the stylus saves the image and transmits a signal to the external processing device. The transmission of the signal to the external processing device can form a new page.

In another feature during the partial erasure the optical sensor and the electronic circuitry of the stylus recognize the portion being erased sending a signal that overwrites a background color on a corresponding portion of the replica image on the display of the external processing device.

Another feature relating to the use of the stylus having the optical sensor comprises a dot pattern polymeric or paper material layer on or in which the dot pattern is formed; comprising a device that enables the dot pattern layer to be fastened to and unfastened from the electronic writing device. The dot pattern layer can further comprise a template that can be viewed through the outer polymer layer. The template can provide information selected from the group consisting of: an arrangement of lines, an image used in a game, a function to be performed by the external processing device and combinations thereof. In another feature the information on the template includes the function in a form of an image a user can touch with the stylus, thereby allowing the stylus to recognize the template and to transmit information identifying the template to the external processing device, whereby the external processing device displays the replica image of the writing on the electronic writing device against a template replica of the template inserted against the electronic writing device.

A second embodiment of the disclosure features an electronic writing system including the following features. A liquid crystal scattering switchable layer includes polymer dispersed liquid crystal material (PDLC). Electrically conductive layers are disposed on either side of the liquid crystal layer. Electronic drive circuitry applies a voltage to the electrically conductive layers that places the liquid crystal material in a substantially transparent state or in an opaque state. A transparent substrate is disposed adjacent to one of the electrically conductive layers forming a writing surface. There is a dot pattern. A stylus includes a sensor and electronic circuitry, and dispenses erasable ink. During movement of the stylus on the writing surface an image in the erasable ink is formed on the writing surface and the sensor and the electronic circuitry read the dot pattern so as to provide electrical information indicating movement of the stylus.

Referring to specific features of the second embodiment, the dot pattern can be disposed in or on a polymeric or paper material layer so as to form a dot pattern layer. The substrate can be comprised of glass. The system can include an external processing device including a display; wherein the electrical information indicating movement of the stylus on the writing surface enables producing on the display of the external processing device a replica image that is a replica of the image. In another feature the stylus and the external processing device include interfaces enabling the stylus to wirelessly transmit the electrical information to the external processing device which receives the electrical information and displays the replica image on the display of the external processing device. Another feature is a window configured and arranged for use in a building comprising the system.

Many additional features, advantages and a fuller understanding of the embodiments of the disclosure will be had from the accompanying drawings and the detailed description that follows. It should be understood that the above Technical Summary describes embodiments of the disclosure in broad terms while the following Detailed Description of Example Embodiments describes embodiments of the disclosure more narrowly and presents specific embodiments that should not be construed as necessary limitations of the invention as broadly defined in the claims.

BRIEF DESCRIPTION OF THE DRAWINGS

It should be appreciated that like numerals represent like parts throughout the several views of the drawings of this disclosure.

DETAILED DESCRIPTION OF EXAMPLE EMBODIMENTS

Provided are embodiments of an electronic writing/drawing tablet that has one or more of the desired features discussed above.

Figure 1:
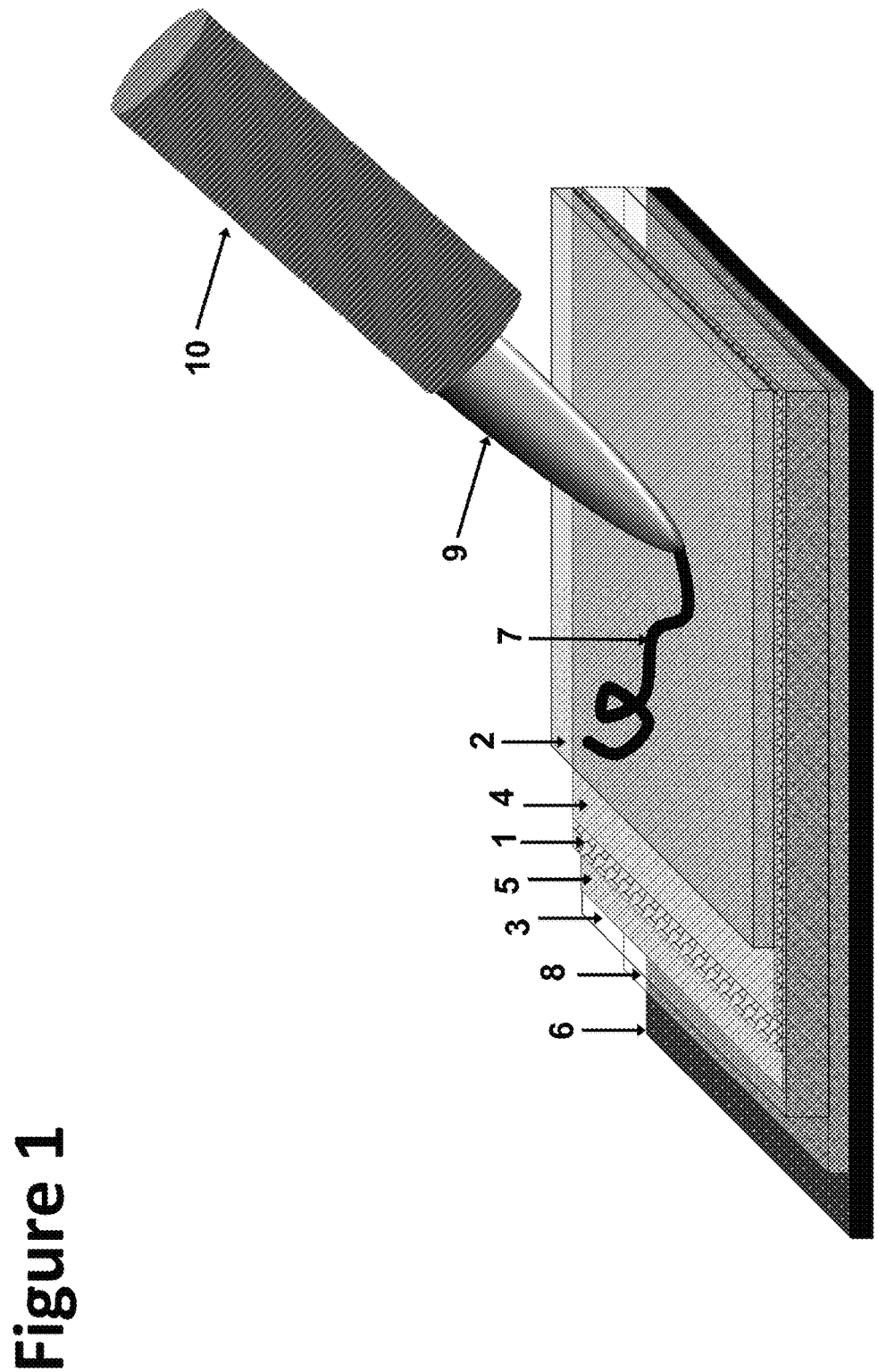
FIG. 1. Preferred embodiment of ChLC eWriter display coupled to a black back substrate patterned with dots.

FIG. 1 shows a multilayer device including a liquid crystal layer including cholesteric liquid crystal material (ChLC) dispersed in a polymeric network depicted by 1 sandwiched between two polymeric substantially transparent substrates 2 and 3 that are coated with a thin layer of a electrically conductive material (4 and 5) facing the ChLC/Polymer dispersion 1. The substrate 2 is flexible. In fact, all layers of the writing device can be flexible. In all embodiments of the disclosure the outer surface of the electronic writing device on which the writing pressure from the stylus is applied is referred to as a writing surface. Here, the outer surface of the substrate 2 forms the writing surface. The electrically conductive layers or electrodes can be patterned and/or unpatterned but in particular are unpatterned (i.e., continuous across an entire viewing area of the writing tablet). A small voltage pulse applied across both electrodes causes the ChLC molecules to arrange in a focal conic texture that is substantially transparent on an adjacent light absorbing (e.g., black) layer or background 6 allowing light absorption by the dark background as is known in the art of cholesteric displays, see U.S. Pat. No. 5,437,811, incorporated herein by reference in its entirety. No voltage is needed to maintain this substantially transparent state indefinitely. The cholesteric liquid crystal material is bistable. When the pressure of a pointed stylus is applied on the writing surface of the top substrate 2, an induced localized flow of the ChLC promotes the reorganization of ChLC molecules to locally arrange in a planar configuration that reflects colored light. See U.S. Pat. No. 6,104,448. This light reflective planar state can exist indefinitely without any voltage being required to maintain it. This property allows brilliantly colored written marks (also synonymous with drawn marks or lines and traces) to be seen through the top substrate 7 on the black contrast of the dark layer 6 as background. Virtually any rigid instrument such as a finger nail or a pointed stylus can create a written mark on this display. This writing or drawing on the display occurs due to the contrast of the written line formed by the reflective state of the liquid crystal material against the background which is seen through the liquid crystal layer when it is in its substantially transparent state.

In this embodiment of the disclosure, a flexible polymer dot pattern layer 6 containing patterned dots in or on the layer is placed under the multilayer system (more distal from the writing surface than the liquid crystal layer is disposed from the writing surface) by using an optional pressure sensitive transparent adhesive 8. In this aspect, the dot pattern layer 6 also functions as the light absorbing layer (i.e., it can be a color or it can be dark, such as black). However, a separate dot pattern layer and light absorbing layer may also be used such as where the dot pattern layer is see-through and closer to the writing surface than the light absorbing layer is to the writing surface. In one aspect, a special stylus or pen 9 includes a solid piece with no ink that, upon pressing or applying writing pressure to the writing surface of the multilayer system, leaves a visible trace or line forming an image, while simultaneously, image detection device 10 attached on stylus 9 optically reads the coded pattern in the back of the writing device on the dot pattern layer 6 using a suitable optical sensor (e.g., camera) and electronics able to read or detect the dots through the multilayer stack, producing electrical information indicating movement of the stylus on the writing surface. Image detecting device 10 of the stylus includes an interface that is capable of wireless transmission of the electrical information indicating the written path or movement of the stylus to an interface or wireless receiver of an external processing device that includes a display. Examples of external processing devices include, smartphones, personal computers (e.g., desktops), tablets, laptops, netbooks, televisions, possible eReaders with connectivity, electronic whiteboards and appropriate software or other devices for displaying a replica (e.g., digital) image that is a replica of the image formed by the liquid crystal layer and capturing or storing the image. In one aspect, for example, the external processing device (e.g., a laptop) could be electrically connected to a projector to optionally display the digital image on the laptop and to project a replica image on a screen.

The stylus configuration might be similar, but is not limited, to the device described in U.S. Pat. No. 6,663,008 B1, filed on Oct. 2, 2000, and incorporated herein by reference in its entirety. For example, the stylus of this example includes an optics component, associated electronic circuitry and a power supply. The optics component can include at least one light emitting diode (LED) for illuminating the surface and a sensor (e.g., optical sensor such as a CCD or CMOS sensor) for recording a two dimensional image. The LED can be an infrared light emitting diode and the sensor can be sensitive to infrared light. The power supply can employ a battery mounted in the stylus. The electronic circuitry can include image processing means for determining a position of the stylus on a basis of the image recorded by the sensor, e.g., a processor programmed to read images from the sensor and carry out position determination based on these images. The sensor and electronic circuitry provide electrical information, such as, x and y position data of the pen and pressure data indicating how heavy or light a line is drawn so as to record the two dimensional dot image being scanned by the user while writing on the writing device (i.e., applying the writing pressure against the liquid crystal layer such that the liquid crystal layer forms the image). The electronic circuitry of the stylus determines the position, movement or trajectory of the stylus as it applies the writing pressure that forms an image by the ChLC layer. After the ChLC layer has been written on, a small pulse can be applied to it so ChLC molecules are driven to their original substantially transparent state erasing the written marks on the ChLC eWriter. However, a digital image or electrical information of the writing displayed by the ChLC layer is already sent wirelessly by the image detecting device 10 to the external processing device that can display the digital image on its screen and/or save the electrical information in its memory.

Figure 2:
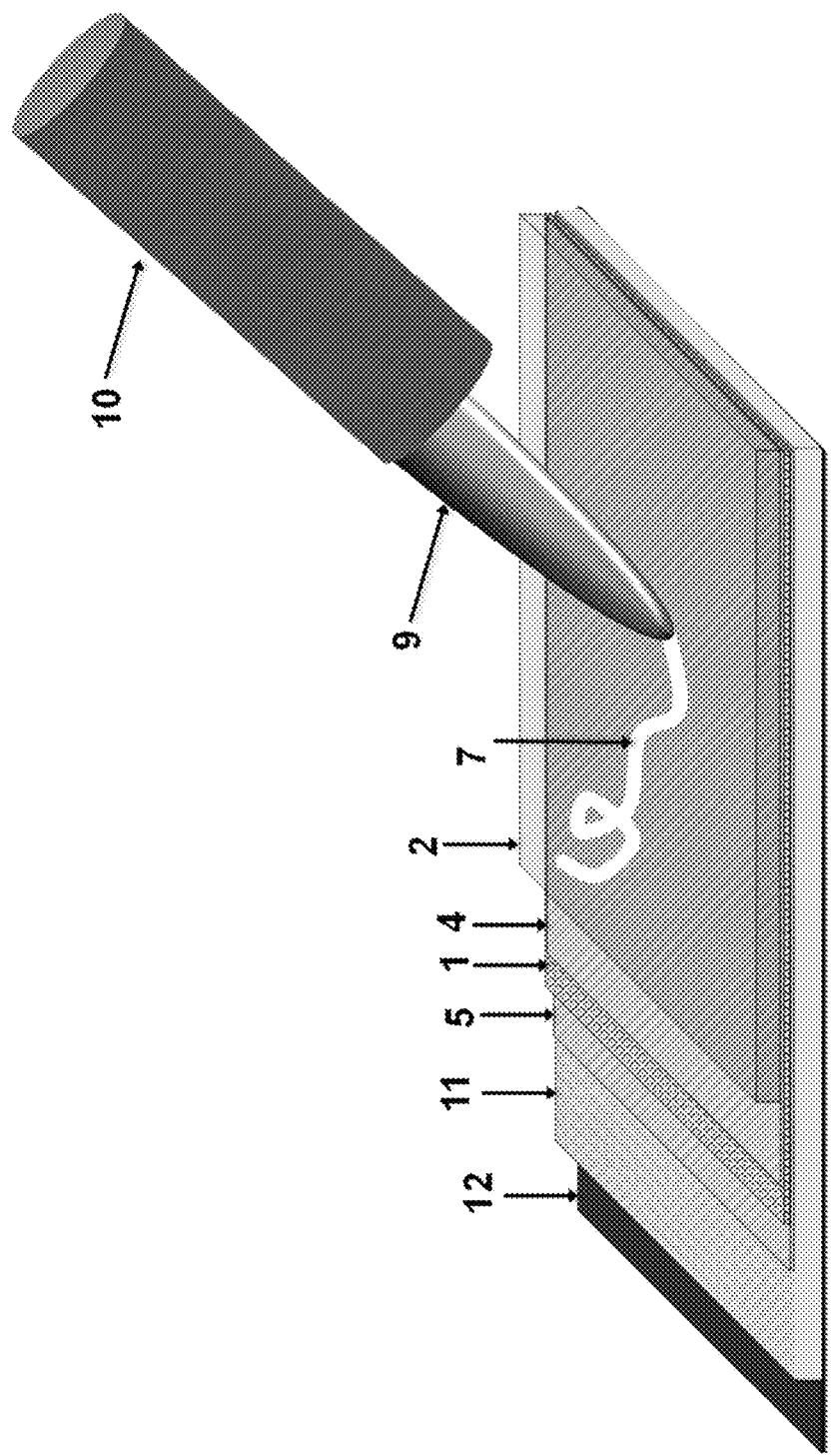
FIG. 2. Pressure sensitive eWriter body with dot pattern printed on back plastic substrate.

FIG. 2 shows a different embodiment of the present disclosure where the coding dot pattern is printed on the surface of a substantially transparent back polymer layer 11 (i.e., reference numeral 11 is a dot pattern layer). This dot pattern layer is coated with a transparent conductive polymer 5 (unpatterned electrically conductive layer). The front transparent substrate 2 also supports another layer of conductive polymer 4 (unpatterned electrically conductive layer). This configuration allows the electrical driving of the ChLC/polymer layer as explained above. A back paint or light absorbing layer 12 that can be opaque or semitransparent, for example, is used to enhance the contrast of the written marks displayed on the surface of the device. The dot array in film 11 could be printed on any side of the substantially transparent film. In another alternative embodiment, layers 11 and 12 can be combined in one flexible back layer with the dot array printed on the surface facing the conductive polymer 5. The dot array can be invisible to the human eye but detectable by the camera attached to the stylus. For example, the dots are optically detectable in infrared but not visible light.

Figure 3:
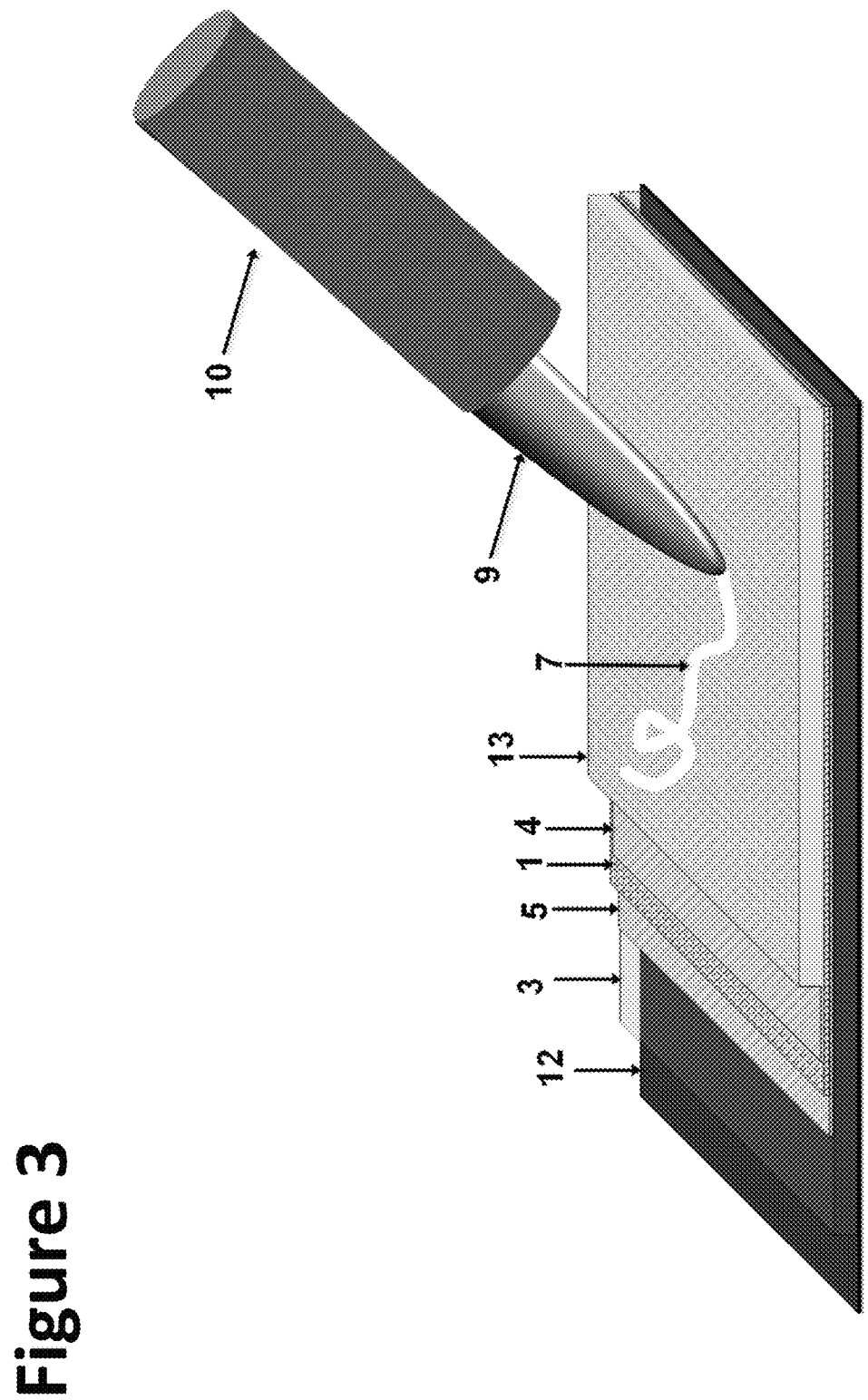
FIG. 3. eWriter with dot pattern printed in the front transparent plastic substrate.

In a similar manner, FIG. 3 shows that the dot pattern can be printed on the front transparent flexible film 13 forming the writing surface, which is used as a substrate to be coated inside with an electrically conductive layer 4 (unpatterned electrically conductive layer). This sheet is employed in the lamination process, this time, as front substrate. In this case, the dot array can be printed on any side of the front transparent substrate. In an alternative configuration, only a dark flexible sheet 12 is used instead of layers 11 and 12 of FIG. 2. The lower substantially transparent substrate 3 is optional.

Figure 4:
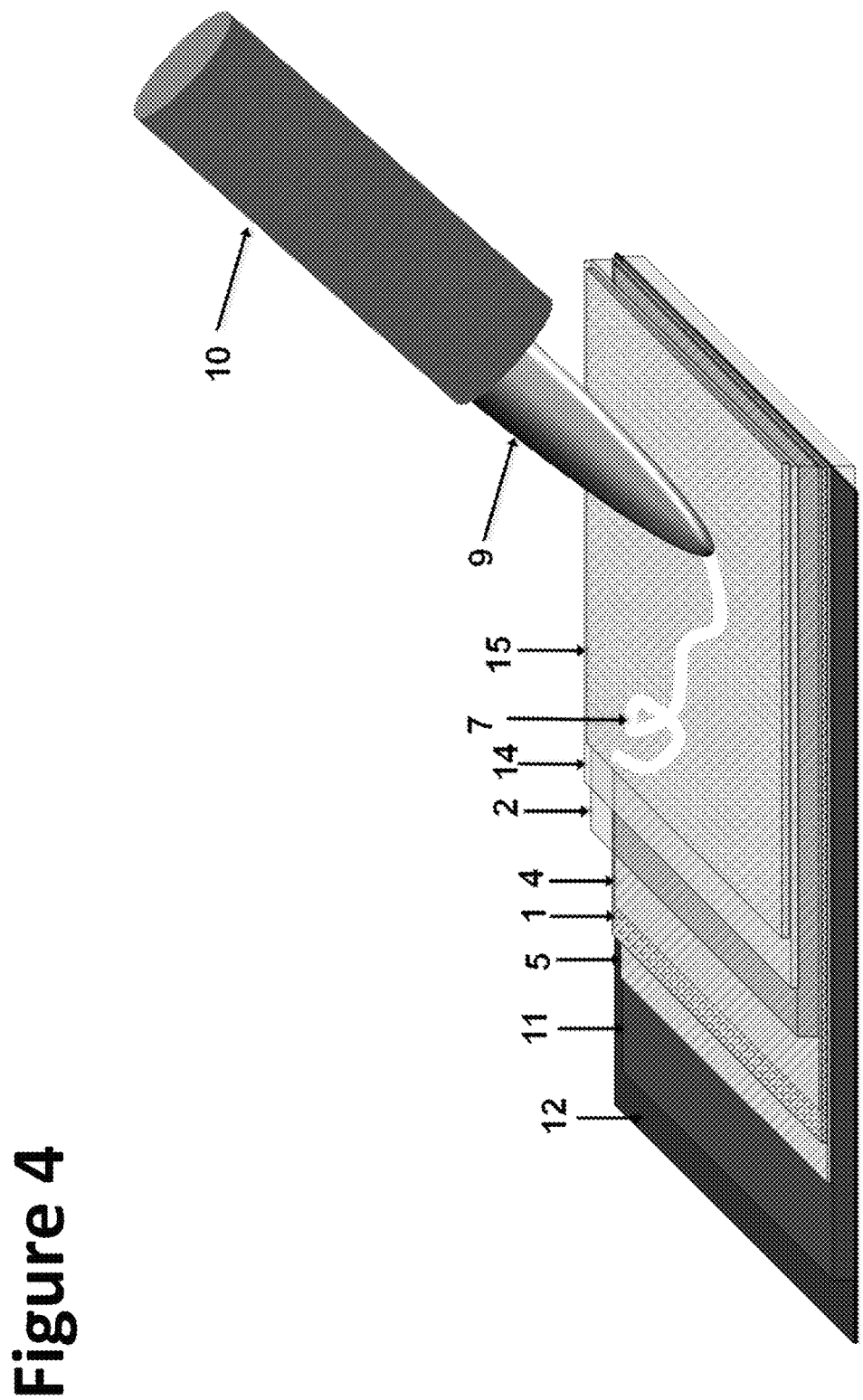
FIG. 4. eWriter where dot array is an attachment of a substantially transparent flexible film on the top plastic substrate.

FIG. 4 shows a dot array transparent sheet 15 (dot pattern layer) attached to the front surface of the Boogie Board® writing tablet using a pressure sensitive adhesive 14. This configuration can be convenient to use for manufacturing purposes. The film is substantially transparent which means that the dot pattern printing is carried out with specialized ink so that the dots do not obscure the written image on the display. A preferred ink is an infrared ink that is invisible to the naked eye (visible light). The coupling between the dot pattern film and the front substrate 2 should allow the force transfer to the front side of the display, creating a reflective mark on the pressure sensitive ChLC layer. At the same time, the special infrared optical device including associated electronic circuitry of the stylus can read, decode and transfer the drawing path of the stylus (electrical information), based on the optical device's detection of the parts of the dot pattern where the stylus is moved, to other external processing devices. It should be appreciated that when the dot pattern layer is formed on top of or as a part of the substantially transparent substrate that is most proximal to a viewer, it forms the writing surface. Whereas when the dot pattern is formed more distal from the viewer than the liquid crystal layer, the writing surface is formed by the outer, flexible substantially transparent polymer layer.

Figure 5:
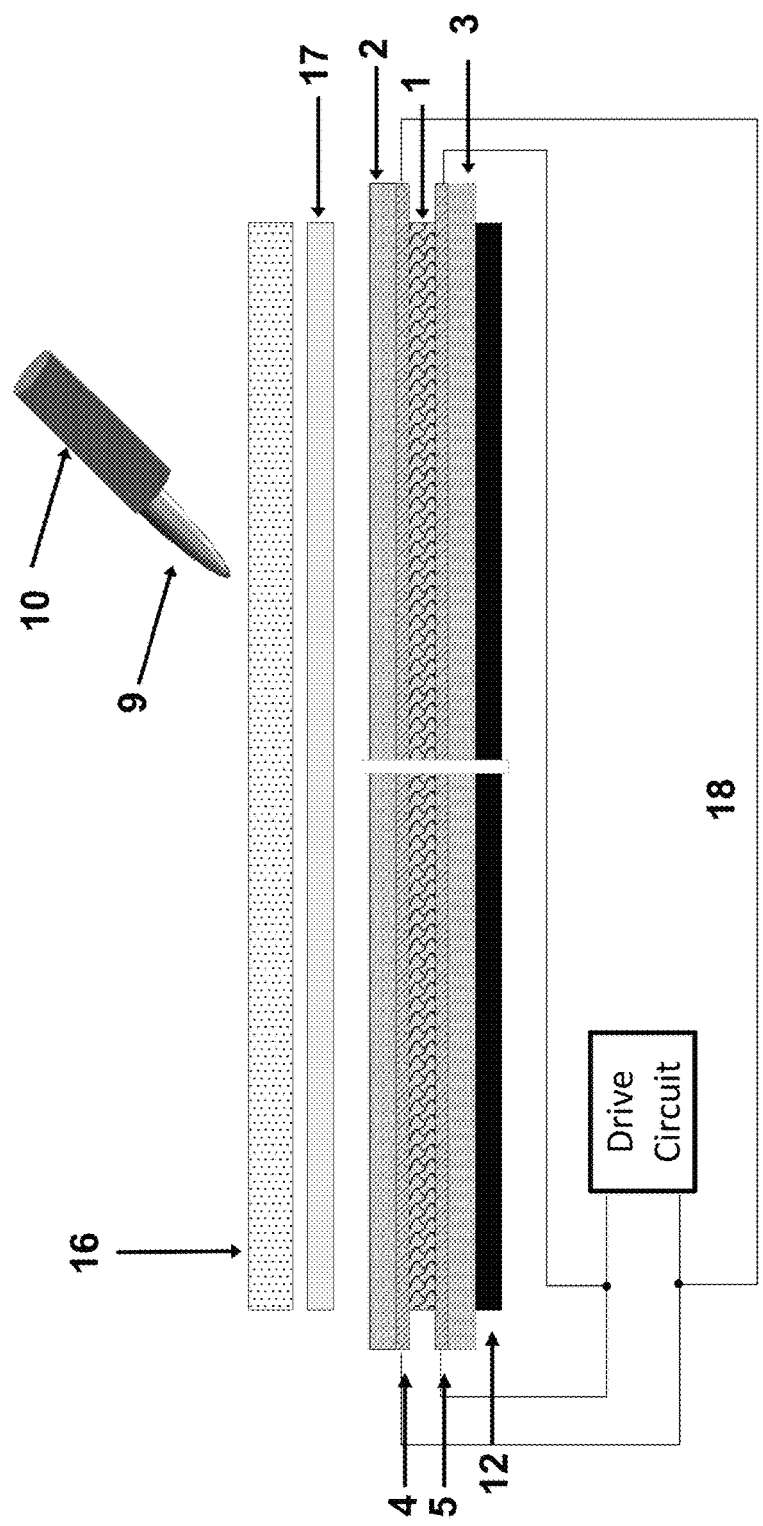
FIG. 5. Tiled displays to create a larger eWriter or eBoard with a transparent top layer with dot pattern recognition.

One of the advantages of the dot pattern recognition technology is that it can be applied to a variety of sizes of devices. In this regard, a large area of dot array film 16 is attached to a ChLC Writing Board Display Device (FIG. 5) with the aim of creating a larger area pressure sensitive device that can be used as a smart board and at the same time to record the images drawn by a specialized stylus that recognizes the attached dot array. U.S. patent application Ser. No. 13/897,004, which is incorporated herein by reference in its entirety, explains how tiling smaller manufacturable size ChLC displays can be used as an alternative to create larger display area devices integrated with the same drive circuitry 18 that can apply erase voltage pulses to the electrically conductive layers to place the liquid crystal in a desired state such as transparent or reflective. A suitable such drive circuit can be employed in any of the electronic devices of this disclosure. Although FIG. 5 shows the dot array layer located on top of the tiled system, this layer can be stacked in any position of the multilayer device using the disclosure of the previous figures, such as more distal from the writing surface (or the viewer) than the liquid crystal layer is disposed from the writing surface (or the viewer).

Figure 6:
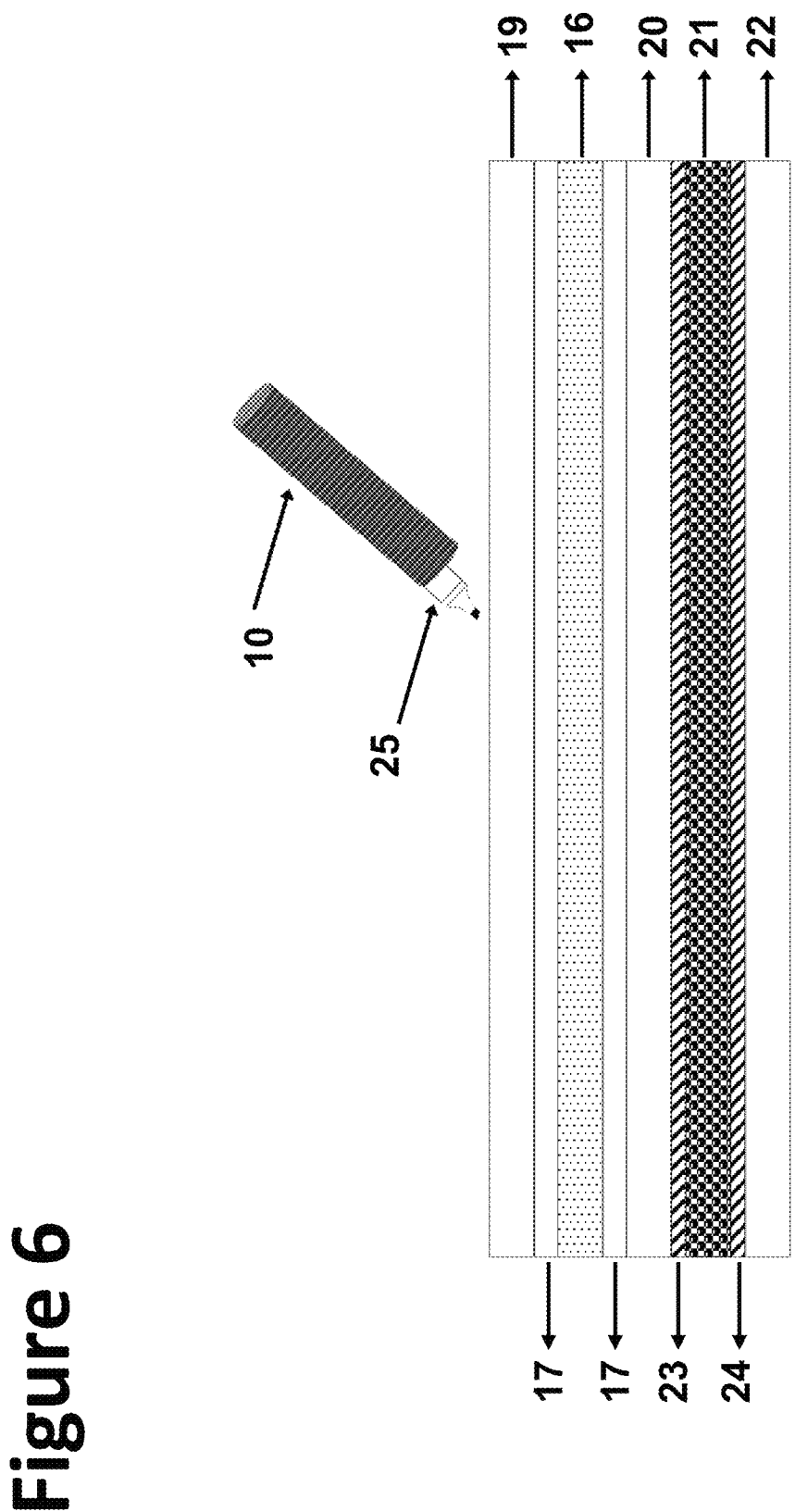
FIG. 6. A glass based switchable privacy window using PDLC active layer with a layer of dot pattern recognition on top of the multilayer device.

Another embodiment is the application of a dot pattern layer on (e.g., the back) of a (e.g., glass based) polymer dispersed liquid crystal, PDLC, (see U.S. Pat. No. 4,688, 900, which is incorporated herein by reference in its entirety) privacy window device that is also used as a switchable "whiteboard." The window is constructed and arranged for use in building construction (e.g., interior or exterior windows of a building). FIG. 6 shows an embodiment where a PDLC layer 21 is sandwiched between two conductive layers (23 and 24) deposited on substantially transparent glass sheets (20 and 22) with a substantially transparent dot pattern recognition layer 16 stacked in between glass sheets (19 and 20) with optional pressure sensitive adhesive coatings 17. The dot pattern layer allows the use of a dry-erase marker 25 with an optical attachment 10 that decodes the trajectory of the drawing by reading the dot pattern code. This electrical information indicating movement of the stylus can be transmitted from the stylus wirelessly to an external processing device (e.g., a laptop or PC) for display as a replica image (i.e., a replica of the image drawn in dry erase marker or displayed by the liquid crystal layer in the embodiments above) on a display of the external processing device. In all embodiments herein interfaces on the stylus and the external processing device can be used to permit wireless transmission and receipt of the electrical information (e.g., as described in U.S. patent application Ser. No. 14/057,261, which is incorporated herein by reference in its entirety, as would be apparent to one skilled in the art in view of this disclosure). The PDLC layer can be electronically switched between a substantially transparent state and an opaque (e.g., optically white) state. This application can be used in large areas for decorative and functional purposes to serve as a transparent window or as a white board with the capability to capture the written image on an external device (e.g., laptop, cell phone or the like). The light shutter is open (the PDLC is substantially transparent) during ordinary use enabling one to see outdoors when it forms an exterior window of a building but can operate as a "whiteboard" or colored board when the PDLC is opaque.

Figure 7:
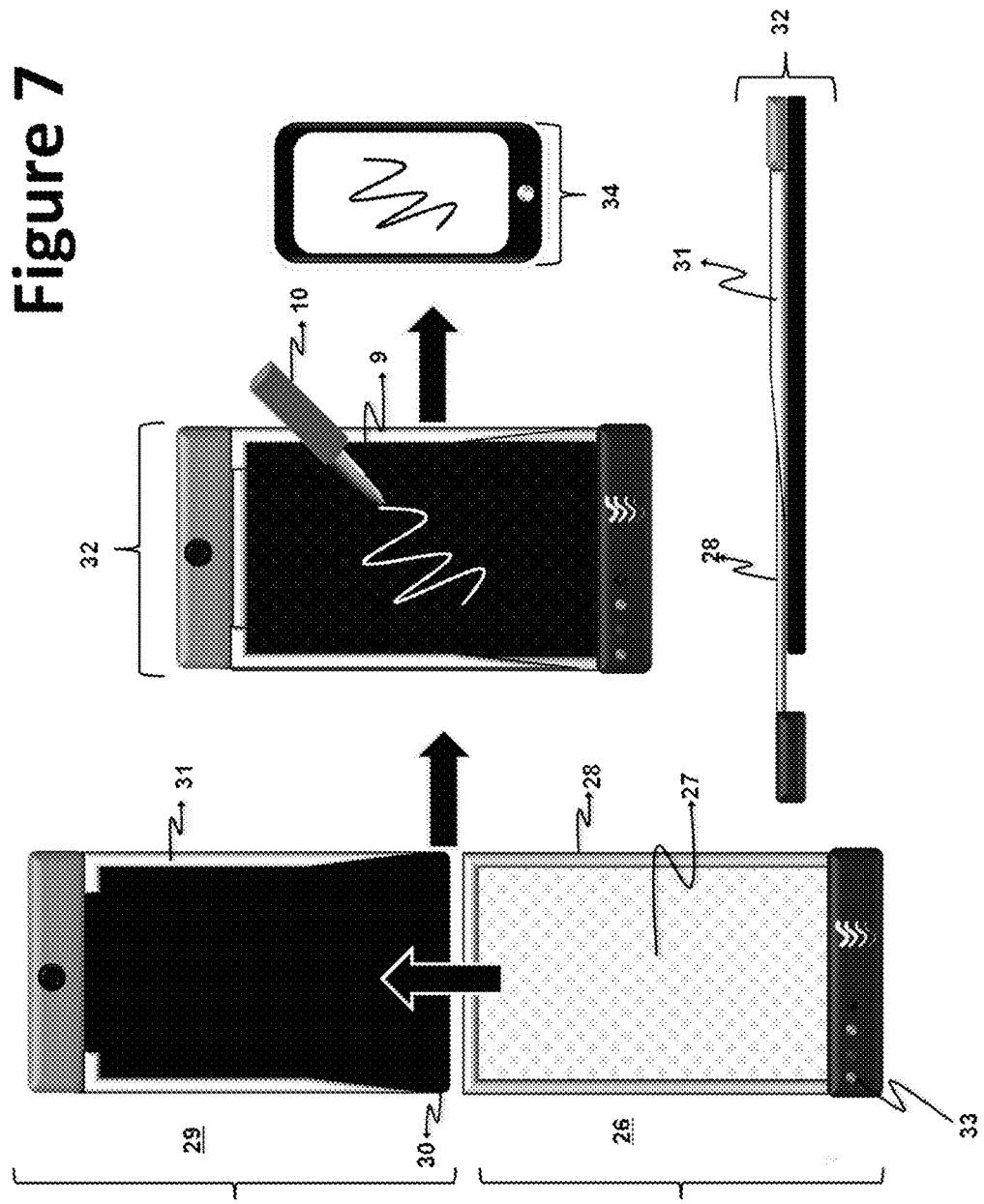
FIG. 7. Replaceable dot array unit. A Boogie Board® eWriter with optional attachment of a dot pattern layer.

FIG. 7 shows an embodiment where the dot pattern system incorporated into a Boogie Board® LCD eWriter can be carried out using a replaceable unit 26 in which the dot array is printed on a substantially transparent flexible plastic sheet 27 (dot pattern layer) that is framed in a rigid material 28. The replaceable unit is slid on the Boogie Board® 29 coupling the surface of the dot array sheet with the surface of the display 30 by inserting the unit in a rigid set of frames 31. The eWriter 32 now has recognition functionality provided by the dot pattern layer. This setup can be complemented with dot pattern labels 33 with specific instructions to the stylus camera such as: changing line color, line thickness, connectivity commands, passing pages, etc. Clearly, these commands are meant to be processed and displayed on a display of an external processing device 34 such smartphones, personal computers (e.g., desktops), tablets, laptops, netbooks, televisions, possible eReaders with connectivity, electronic whiteboards and appropriate software or other devices. When the replaceable unit is placed on the Boogie Board® writing tablet 29 the coupling between the dot patterned sheet and the surface of the Boogie Board® writing tablet is precise so the force applied during writing is accurately transmitted to the ChLC.

Figure 8:
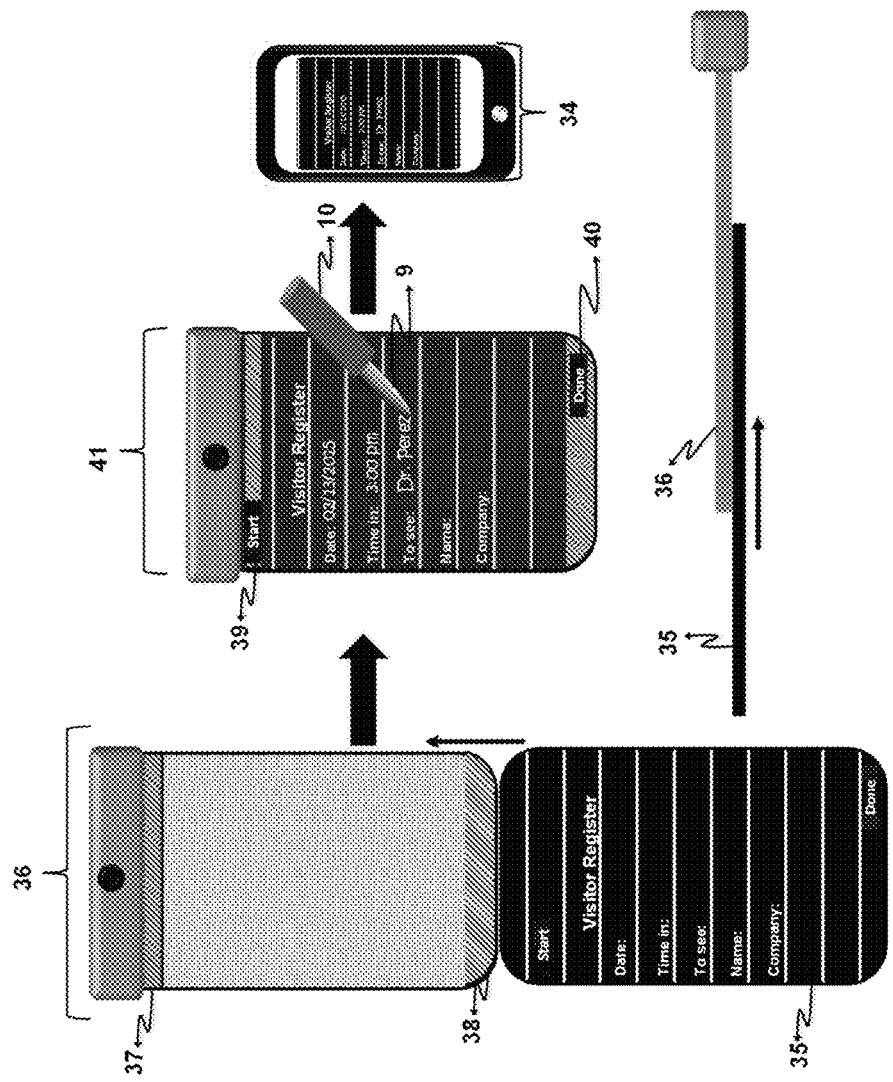
FIG. 8. Boogie Board® eWriter with insert application showing template recognition dot array.

In an alternative embodiment, the replaceable unit can be introduced in the Boogie Board® writing tablet as an insert in the back of the multilayer device as shown in U.S. patent application Ser. No. 13/477,638 (incorporated herein by reference in its entirety) that describes a Boogie Board® writing device using a semitransparent ink color filter as a background. The small absorption enhances the contrast of the cholesteric reflection when the image is written. The semitransparency of the liquid crystal display of the writing device enables the use of templates or patterns to be placed behind the display. The application here described combines the template insertion concept with dot pattern recognition system as depicted in FIG. 8. A dark background template 35 can be inserted in the back of a Boogie Board® writing device 36 that contains a dot pattern or a dot pattern layer attached in any of the combinations previously described including a semitransparent background following the disclosure of U.S. patent application Ser. No. 13/477,638. The dot pattern layer covers the entire writable display surface except optionally for portions at the top and bottom of the display 37, 38. These portions are big enough to fit the two command portions of the insert 39 40 that contain a dot pattern image that provides information to the electronic stylus about the type of insert that is being coupled to the device. When the insert 35 is slid in place on the Boogie Board® writing device 36 together they form the enhanced Boogie Board® writing device 41 (such as using the frame described in FIG. 7 or other suitable device). The user can touch the start image 39 allowing the stylus to recognize the template that is being used and transmit the electrical information and this template information to the external processing device 34. This enables the external processing device to display the replica image of the writing on the electronic writing device against a template replica of the template 35 that is physically attached to the back of the eWriter 36. When the user is done, the finalizing button 40 can be touched by the digital stylus to save the image and proceed with a next page on the external processing device.

Select Erase Capability

U.S. Pat. No. 8,139,039 and incorporated herein by reference in its entirety, discloses a design for a multi-color dual-mode drawing tablet that allows for selective erasure of drawn images, rather than requiring erasing the entire image as discussed above. In this design, a "mode A" is provided where, using the pressure of a pointed stylus, an image is drawn on the pad via the liquid crystal in the focal conic state against the background liquid crystal in the planar state. Also provided is a "mode B" where, using pressure, a color image is drawn on the tablet via the liquid crystal in a planar state against the background liquid crystal in the focal conic state. Mode B may be considered as the negative image of Mode A. In the above described embodiments without selective erase, the primary mode of operation is Mode B.

This multi-mode approach can be used in another example embodiment of the instant device by using only two colors, a foreground color and a background color, to both draw and erase images on the electronic writing device (referred to synonymously as a drawing tablet). In such a device, portions of a drawing displayed on the drawing tablet that was drawn using one mode can be erased by changing the mode of operation to the other mode, and then writing the background color over the drawing, essentially erasing the drawn image as described in more detail in U.S. Pat. No. 8,228,301, which is incorporated herein by reference in its entirety.

Hence, for example, a device using the dual-mode operation may operate for normal drawing in Mode B, which requires no voltage across the drawing pad during the drawing operation using pressure, such as via the tip of the stylus. Since this reduces the power consumption during the drawing process it is a normal mode of operation.

However, if the user desires to erase a part of the displayed image, the drawing pad can be transitioned to Mode A for selective erasure wherein voltage is applied to electrodes of the writing tablet during the erasure process. This might be done by activating a push switch or other actuator provided on the device, or by activating some menu item or actuator on a remote device with which the tablet is connected, paired with the electronics of the Boogie Board® writing tablet causing the tablet to change its mode of operation from Mode B to Mode A.

In any of the aforementioned applications, the erasing function of the displays could be coupled with a wireless signal that communicates to the electronic stylus or to the external processing device that a new writing page is needed. This function can be carried out by having a Bluetooth transmitter attached to the erase button of the eWriter. Once the display is erased the signal will trigger a command that saves the previous writing transmitted to the external device and simultaneously creates a new page ready to be written on the display of the external device. The advantage of this configuration is that eWriter erase saves the written image and changes the page simultaneously.

Another strategy includes using a dot pattern image printed on any place of the Boogie Board® writing tablet that commands the digital pen (optical stylus) to save the current images and create a new writable page. To activate this function the user has to touch this image with the digital pen. Then the user can erase the eWriter by pressing a button that applies a small voltage across the display. One advantage of this application is that the Boogie Board® writing tablet does not have its electronics modified as the command is read by the electronic stylus directly from the small dot patterned image that can be added in any of the configurations previously described.

EXAMPLES

Example 1

A Boogie Board® writing tablet purchased from Brookstone® retail store was disassembled so that the opaque coating from the back substrate could be removed. The ink was removed using an acetone wipe. After cleaning, the display was coated with a 2 mil transparent pressure sensitive adhesive 3M 8212 on the back side of the display. A black paper sheet with infrared dot array provided by Pengenerations® was laminated to the Boogie Board® writing tablet using a catena General Binding Corp 65R that was preheated to 160° F. The lamination was performed at zero nip gap. An ADP-601 electronic pen purchased from Pengenerations® was paired with the software PenHub from Pengenerations® installed in a personal computer. The ink ball pen of the electronic device was replaced by a pointed stylus without ink that allowed pressure writing on the Boogie Board® writing tablet. The writing trajectory or path of the written marks was detected by the infrared camera and electronics of the electronic stylus and transmitted to the paired computer and displayed by PenHub software. The final device was capable of simultaneously displaying the written image on the pressure sensitive display and transmitting in real time or near real time to the personal computer the electrical information or signal indicating the writing trajectory.

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electronic writing device comprising:
    a liquid crystal layer including cholesteric liquid crystal material dispersed in polymer;

electrically conductive layers disposed on either side of said liquid crystal layer;

a flexible outer polymer layer that is substantially transparent and is located adjacent one of said electrically conductive layers near a viewing side of the electronic writing device;

a dot pattern that is optically detectable through said outer polymer layer and said liquid crystal layer;

a light absorbing layer that absorbs light passing through said liquid crystal layer from the viewing side of the electronic writing device, said light absorbing layer being opaque or semitransparent;

a stylus configured to apply writing pressure to said outer polymer layer that causes reflectance of said cholesteric liquid crystal material to change so as to display an image on said liquid crystal layer, wherein said stylus is further configured to include a tip that does not dispense ink by which said writing pressure is applied, a sensor adapted to optically record a portion of said dot pattern over which said stylus is moved, and electronic circuitry configured to read said optically recorded portion of said dot pattern and to provide therefrom a digital image or electrical image information of the image displayed on said liquid crystal layer, said electronic circuitry including a transmitter for transmitting to a remote processing device said digital image or said electrical image information; and erase electronics that apply a voltage to said electrically conductive layers that places said cholesteric liquid crystal material in an optical state that erases the image.

2. The electronic writing device of claim 1 wherein said dot pattern is disposed in or on a polymeric or a paper material layer so as to form a dot pattern layer.

3. The electronic writing device of claim 2 wherein said liquid crystal layer, said electrically conductive layers, said outer polymer layer and said dot pattern layer are flexible.

4. The electronic writing device of claim 2 wherein said dot pattern layer functions as said light absorbing layer that absorbs light passing through said liquid crystal layer.

5. The electronic writing device of claim 2 wherein dots of said dot pattern are imprinted in or on said dot pattern layer.

6. The electronic writing device of claim 2 including a transparent pressure sensitive adhesive disposed between said dot pattern layer and an adjacent said electrically conductive layer.

7. The electronic writing device of claim 2 wherein said dot pattern layer is transparent to visible light.

8. The electronic writing device of claim 7 wherein dots of said dot pattern layer are formed by ink that is viewable in infrared light but not in visible light.

9. The electronic writing device of claim 2 wherein a location of individual dots of said dot pattern layer can be discerned based on a position of said individual dots in said dot pattern.

10. The electronic writing device of claim 2 wherein said liquid crystal layer, said electrically conductive layers, said outer polymer layer and said dot pattern layer are integral parts of said writing device.

11. The electronic writing device of claim 2 comprising a rigid housing for at least said liquid crystal layer, wherein said housing includes a frame forming a slot that receives said dot pattern layer.

12. The electronic writing device of claim 1 wherein said electrically conductive layers are unpatterned and substantially continuous across said liquid crystal layer.

13. A system including the electronic writing device of claim 1 and said remote processing device.

14. The system of claim 13 wherein said remote processing device include a receiver configured to receive said digital image or said electrical image information and said remote processing device is adapted to display said digital image as a replica of the image displayed on said liquid crystal layer or to save said electrical image information.

15. The system of claim 14 comprising a polymeric or a paper material layer on or in which said dot pattern is disposed so as to form a dot pattern layer.

16. The system of claim 15 wherein said dot pattern layer further comprises a template that can be viewed through said outer polymer layer.

17. The system of claim 16 wherein said template provides information selected from the group consisting of: an arrangement of lines, an image used in a game, a function to be performed by an external processing device and combinations thereof.

18. The system of claim 17 wherein said information on said template includes said function in a form of an image a user can touch with said stylus, thereby allowing said stylus to recognize the template and to transmit information identifying the template to said remote processing device of the system, whereby said remote processing device displays the replica image of the writing on the electronic writing device against a template replica of the template of the electronic writing device.

19. The system of claim 16 comprising a device that enables said dot pattern layer to be fastened to and unfastened from said electronic writing device.

20. The system of claim 13 wherein a command in a form of said dot pattern is disposed on said electronic writing device which when read by said sensor and processed by said electronic circuitry of said stylus transmits a signal to said remote processing device.

21. The system of claim 20 wherein said transmission of the signal to said remote processing device forms a new page.

22. The electronic writing device of claim 1 comprising a template viewed along with the image formed on said liquid crystal layer, said template including an image regarding a function to be performed by the remote processing device, whereby a user can touch the image of said template, thereby allowing said stylus to recognize the image of said template and to transmit information to said remote processing device enabling the function to be performed.

23. An electronic writing board comprising a plurality of said electronic writing devices of claim 2 that are tiled together so as to be electrically interconnected with each other, wherein said dot pattern extends continuously across said plurality of writing devices.

* * * * *